US008234689B2

(12) United States Patent
Jelavic et al.

(10) Patent No.: US 8,234,689 B2
(45) Date of Patent: Jul. 31, 2012

(54) SYSTEM AND METHOD FOR GENERATING TARGET AREA INFORMATION OF A BATTLEFIELD USING INFORMATION ACQUIRED FROM MULTIPLE CLASSIFICATION LEVELS

(75) Inventors: Robert Jelavic, East Northport, NY (US); Eric Hansen, Babylon, NY (US); Jack L. Gold, East Meadow, NY (US); Surendra Seobarrat, Huntington Station, NY (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 407 days.

(21) Appl. No.: 12/565,329

(22) Filed: Sep. 23, 2009

(65) Prior Publication Data

US 2011/0023132 A1    Jan. 27, 2011

Related U.S. Application Data

(60) Provisional application No. 61/271,454, filed on Jul. 21, 2009.

(51) Int. Cl.
*H04L 9/00* (2006.01)
(52) U.S. Cl. .......................................................... 726/1
(58) Field of Classification Search .................. 726/1–4, 726/11, 22–23, 26–30; 713/166–167; 380/255, 380/258; 709/201, 238; 342/357.2, 357.21, 342/357.22, 45; 701/400, 412
See application file for complete search history.

(56) References Cited

U.S. PATENT DOCUMENTS

| | | | |
|---|---|---|---|
| 7,146,644 B2 * | 12/2006 | Redlich et al. | 726/27 |
| 7,509,434 B1 | 3/2009 | Crosmer et al. | |
| 7,647,505 B2 * | 1/2010 | Yudasaka | 713/186 |
| 2008/0010305 A1 | 1/2008 | Jha | |

(Continued)

OTHER PUBLICATIONS

Samuel D Bass, Rusty O Baldwin A model for managing decision-making information in the GIG-enabled battlespace; Air and Space Power Journal: Summer 2007; pp. 100-108; Air Force Research Institute (AFRI), Maxwell Air Force Base, United States.

(Continued)

*Primary Examiner* — Hosuk Song
(74) *Attorney, Agent, or Firm* — Dilworth & Barrese, LLP; Leo G. Lenna; Daniel J. Long (57) ABSTRACT

A system and method for generating target area information. The system comprises a first processor effective to receive first information of a first classification level and a second processor effective to receive second information of a second classification level distinct from the first classification level. A cross domain processor is in communication with the first and second processors. The second processor is effective to receive a request from a requesting entity about a region of interest and interrogate a first sensor regarding the request. The second processor is further effective to receive first information from the first sensor and send the request through the cross domain processor to the first processor. The first processor is effective to interrogate a second sensor regarding the request and receive second information from the second sensor. The first processor is further effective to filter the second information based on the first and second classification levels to produce filtered information and send the filtered information through the cross domain processor to the second processor. The second processor is further effective to integrate the first information and the filtered information to produce integrated information and send the integrated information to the requesting entity.

20 Claims, 8 Drawing Sheets

U.S. PATENT DOCUMENTS

2008/0158256 A1    7/2008  Russell et al.
2008/0235318 A1    9/2008  Khosla et al.

OTHER PUBLICATIONS

Clark Weissman, MLS-PCA: A High Assurance Security Architecture for Future Avionics; Computer Security Applications Conference, 2003. Proceedings. 19th Annual; Issue Date: Dec. 8-12, 2003; pp. 2-12; United States.

Gilkey, Craig M.; Proof of Concept Integration of a Single-Level Service-Oriented Architecture into a Multi-Domain Secure Environment; Master's thesis; pp. 1-158; Mar. 2008; Corporate Author : Naval Postgraduate School Monterey, CA; United States.

Robert Jelavic Air-to-Ground Combat ID via Link 16 (a.k.a. CID Server) Bold Quest Planning Conference, Naval Aire Base, Little Creek, VA, Jan. 24, 2007.

Robert Jelavic Comabt ID Server for Air to Ground Identification NATO Air-Surface Identification Ad Hoc Working Group, Koblenz, Germany, Dec. 11, 2007.

Robert Jelavic CID Server at Exercise Bold Quest NATO Air-Surface Identification Ad Hoc Working Group, Koblenz, Germany, Dec. 11, 2007.

* cited by examiner

Fig. 7

SYSTEM AND METHOD FOR GENERATING TARGET AREA INFORMATION OF A BATTLEFIELD USING INFORMATION ACQUIRED FROM MULTIPLE CLASSIFICATION LEVELS

PRIORITY CLAIM

This application claims priority to U.S. Provisional Application Ser. No. 61/271,454 filed Jul. 21, 2009 entitled "SYSTEM AND METHOD FOR PROVIDING TARGET AREA INFORMATION IN A BATTLEFIELD USING INFORMATION ACQUIRED FROM MULTIPLE CLASSIFICATION LEVELS", the entirety of which is hereby incorporated by reference.

The invention was made with United States Government support under Contract No. W15P7T-07-C-P427 awarded by The United States Department of the Army. The United States Government has certain rights in this invention.

BACKGROUND OF THE INVENTION

1. Field of the Invention

This disclosure relates to a system and method for generating target area information of a battlefield and, more particularly, to a system and method for generating target area information using information acquired from multiple classification levels.

2. Description of the Related Art

Tactical edge warfighters could benefit from relevant information about a target area including precise enemy coordinates, potential threats, nearby friendly and neutral forces and non-combat personnel and facilities. Rapidly changing battlefield conditions, multiple information sources, and variously equipped tactical edge warfighters engaged with enemy combatants or tasked to strike enemy targets make the provision of such relevant information very difficult.

Prior art techniques for providing an image of a battlefield may include an air controller attempting to orient a pilot of an incoming fighter plane through radio or satellite communications. Such communication is severely limited by the soldier attempting to explain verbally the location of certain friendly and/or enemy targets perhaps by describing major land features. These communications could be augmented somewhat with global positioning system (GPS) or satellite information. This disclosure describes an improvement over these prior art systems.

SUMMARY OF THE INVENTION

One embodiment of the invention is a system for generating target area information. The system comprises a first processor effective to receive first information of a first classification level; a second processor effective to receive second information of a second classification level distinct from the first classification level; and a cross domain processor in communication with the first and second processors. The second processor is effective to receive a request from a requesting entity about a region of interest; interrogate a first sensor regarding the request; receive first information from the first sensor; and send the request through the cross domain processor to the first processor. The first processor is effective to interrogate a second sensor regarding the request; receive second information from the second sensor; filter the second information based on the first and second classification levels to produce filtered information; and send the filtered information through the cross domain processor to the second processor. The second processor further effective to integrate the first information and the filtered information to produce integrated information; and send the integrated information to the requesting entity.

Another embodiment of the invention is a method for generating target area information in a system comprising a first processor effective to receive first information of a first classification level, a second processor effective to receive second information of a second classification level distinct from the first classification level, and a cross domain processor in communication with the first and second processors. The method comprises at the second processor receiving a request from a requesting entity about a region of interest; interrogating a first sensor regarding the request; receiving first information from the first sensor; and sending the request through the cross domain processor to the first processor. The method further comprises at the first processor interrogating a second sensor regarding the request; receiving second information from the second sensor; filtering the second information based on the first and second classification levels to produce filtered information; and sending the filtered information through the cross domain processor to the second processor. The method further comprises at the second processor integrating the first information and the filtered information to produce integrated information; and sending the integrated information to the requesting entity.

Yet another embodiment of the invention is a processor comprising a converter effective to receive sensor information and convert the sensor information into converted sensor information; and an integrator in communication with the converter, the integrator effective to receive and integrate the converted sensor information to produce integrated information. The converter is further in communication with the integrator and effective to receive and convert the integrated information to produce formatted integrated information. A filter is in communication with the integrator, the filter effective to receive and filter the integrated information based on a classification level of the sensor information to produce filtered information. A formatter is in communication with the filter, the formatter effective to receive and format the filtered information to produce filtered and formatted integrated information.

BRIEF DESCRIPTION OF THE DRAWINGS

The drawings constitute a part of the specification and include exemplary embodiments of the present invention and illustrate various objects and features thereof.

DETAILED DESCRIPTION OF THE PREFERRED EMBODIMENT(S)

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Prior art techniques for providing a view of a battlefield are inadequate. Fighter aircraft, Forward Air Controllers, and fire support officers need to quickly know the coordinates of friendly forces and enemy targets. Sensors are available to acquire this information but prior art systems have not been able to collect information of differing classification levels from multiple distinct sensors and communication devices using different encryption techniques and protocols to provide a single integrated picture of the battlefield.

Figure 1:
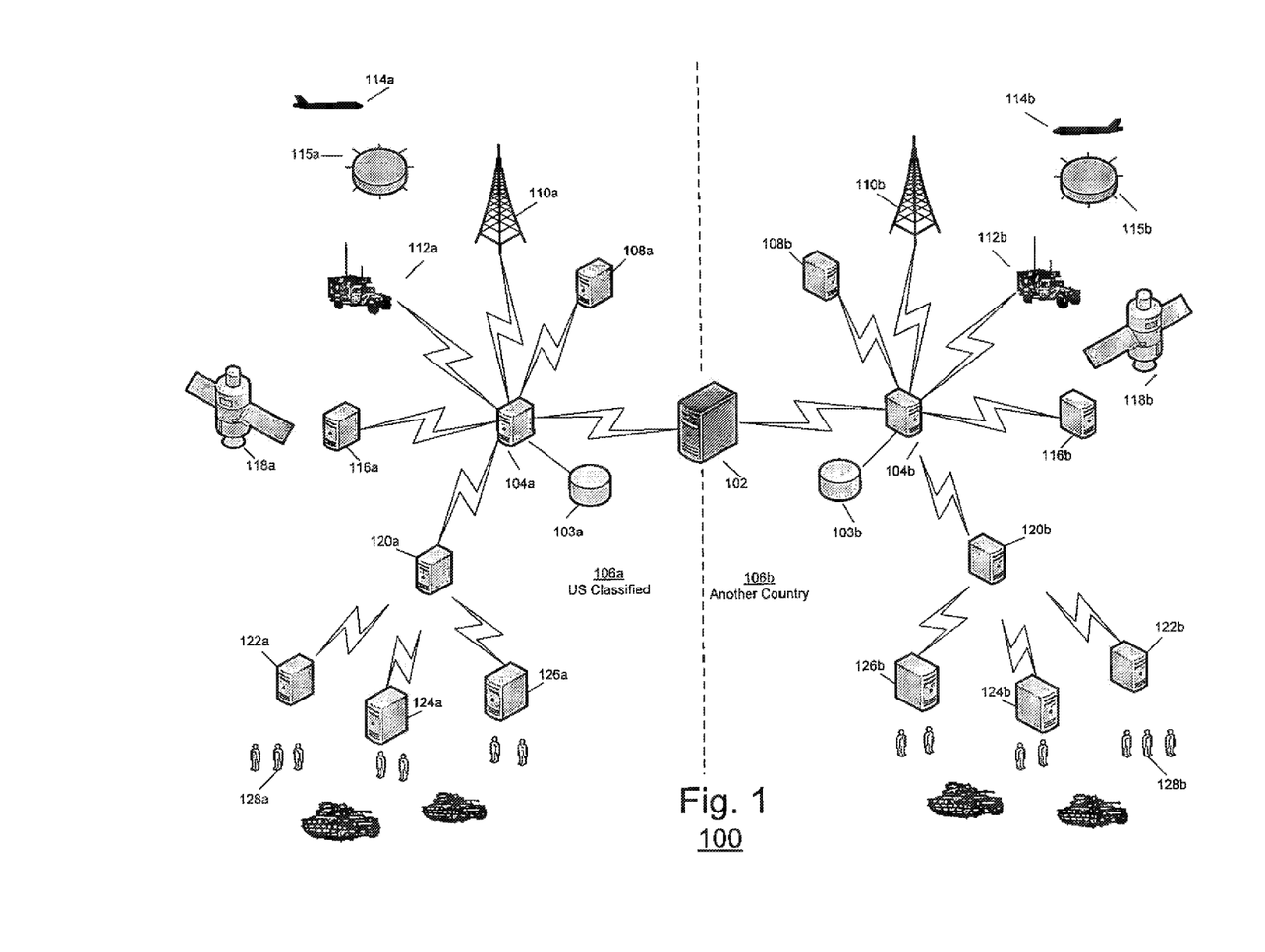
FIG. 1 is a system drawing of a system for generating target area information of a battlefield in accordance with an embodiment of the invention.

Referring to FIG. 1, there is shown a system 100 in accordance with an embodiment of the invention. System 100 can generate target area information of a battlefield using information acquired from a plurality of distinct sensors. Such sensors may have information with differing classification levels. For example, as shown, a first classification level 106a may include information sensitive to the United States. Sensors in classification level 106a may gather information that is pertinent to a United States force and may also be pertinent to a coalition of forces such as ISAF (International Security Assistance Force) forces or to another country. The coalition of forces may benefit from the information gathered from the sensors in classification level 106a. Yet, there may be certain types of information gathered by the sensors in classification level 106a that should not be released beyond classification level 106a. For example, information can be tagged so that certain users know not to fire in a particular region of interest (discussed in more detail below) but the information released to those users does not include the number and types of units in the region of interest.

In system 100, combat identification processor 104 interrogates and receives target area information from sensors and may store the information in a database 103. Sensors acquire information of a battlefield such as position location information (PLI) of units and may take a myriad of forms as shown in FIG. 1. The sensors may be fixed and dedicated to a particular geographic region or may be mobile. For example, sensors may be in the form of a server or computer 108 such as, for example, the ISAF Tracking System, SINCGARS (Single Channel Ground and Airborne Radio System), Soldier Radio Waveform (SRW), JADOCS (Joint Automated Deep Operations Coordination System), NORTAC COP, or other systems. Sensors may be in the form of a communication tower 110 such as, for example, a BTIDS (battlefield tactical identification system) tower, a RBCI (radio based combat identification) tower, a Reverse Mode 5 ground responder, etc. Sensors may be in the form of a portable communication link 112 in communication with an aircraft 114 such as, for example, a QNT (Quint Networking Technology), Link 16 or SADL (Situation Awareness Data Link) link.

Sensors may be in the form of a server 116 in communication with a satellite 118 such as, for example, a FBCB2 (Force XXI Battle Command Brigade and Below) in communication with an L-Band satellite. Sensors may also be accessible over a network such as by a network server 120 in communication with other network servers 122, 124, 126 which, in turn, communicate with sensors such as those held by soldiers or vehicles 128. Soldiers or pilots 128 may be equipped with sensors so that system 100 may serve as a personnel recovery system if a soldier or pilot is lost such as in a personnel recovery management system such as the Internal Satellite System for Search and Rescue COSPAS SAR-SAT.

Sensors could include a blimp equipped with a transponder, or an unmanned aerial vehicle (both shown generally at, for example, 114). Sensors could be equipped with hyperspectral cameras, radar, or other ISR (intelligence surveillance reconnaissance). Still further examples of sensors include situation awareness (SA) feeds such as the United Kingdom Helicopter Asset Tracking System (HeATS) and Ground Asset Tracking System (GrATS) systems, unmanned ground sensors, Command and Control Personal Computer (C2PC), or the Army Battle Command System (ABCS).

Sensors may communicate using a plurality of data formats or protocols such as VMF (Variable Message Format), binary, XML (Extensible Markup Language), HTTP (Hypertext Transfer Protocol), MTC (Multi TADIL-J Capability), Joint Range Extension Application Protocol (JREAP) etc. and use a plurality of different network protocols such as UDP (User Datagram Protocol), TCP/IP (Transmission Control Protocol/Internet Protocol), etc.

For example, protocols such as a NFFI (NATO Friendly Force Information), and systems such as the Naval Fire Control System, AFATDS (Advanced Field Artillery Tactical Data System), RBCI (Radio Based Combat Identification), NCTI (Non-Cooperative Target Information), IRS (Intelligence Surveillance and Reconnaissance), UGS (unmanned ground sensor), BTIDS, RBSA, FAC, TADIL-J, etc., could be used. UGS sensors can provide reports of ground activity using imagery, vibration or motion sensors. IRS platforms use airborne imagery analysis.

Distribution of sensor information data among classification levels can be controlled by tagging data such as by age or classification level. System 100 can be used with existing battlefield command systems such as StrikeLink/AFATDS/NFCS. System 100 can improve information at tactical edge for dismounts such as TACP CASS/StrikeLink/PFED. Dismounted warfighters can directly make requests to the system to receive PLI of friendly units, hostile units, no strike list locations, suspect positions, or non-combatants. System 100 can provide enhanced database capabilities such as history, tracking and improved reliability. Deployment may be made on fault tolerant computing platforms.

Figure 2:
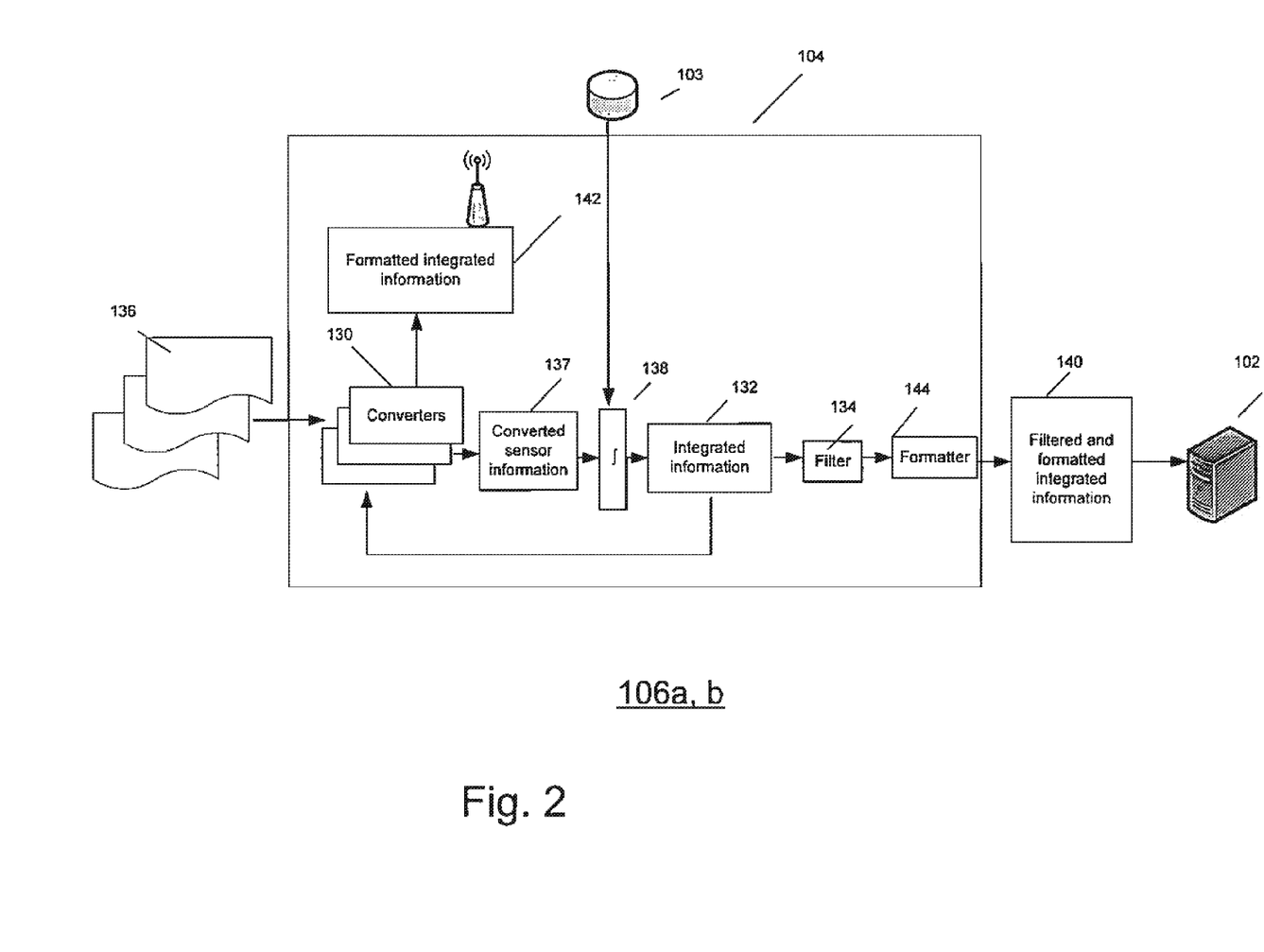
FIG. 2 is a system drawing of a combat identification processor and cross domain processor in accordance with an embodiment of the invention.

Referring to FIG. 2, combat identification processors 104 interrogate sensors (FIG. 1) and receive sensor information 136. Sensor information 136 may be received from multiple classification levels (as discussed above). Combat identification processors 104 each have converters 130 for each of the formats or protocols referenced above to produce converted sensor information 137 in a uniform format. Information about a region of interest may come from multiple sensors. Converted sensor information 137 along with information stored in database 103 is integrated by an integrator 138, in communication with converter 130, to produce integrated information 132. For example, sensor information 136 may include a unique identifier such as a unit resource number or transponder identifier unique to each sensor.

Sensor information 136 may include, for example: latitude, longitude, altitude, creation time of PLI, sensor identifier (unit resource number or transponder ID) and system type. Sensor information 136 reported by cooperative systems can be correlated by unit resource number or transponder ID as typical sensor systems report this information as an identifier to track which unit the PLI came from. System 100 can determine which PLI came from distinct units based on the timestamp and can determine latest reported positions.

Sensor information from non-cooperative target systems can provide information regarding activity or directions of units but typically not with correlation to specific unit. These reports generally include a position or time and a type of detection (such as movement). This information can then be provided to users who receive reports of information other than just friendly units. The information can be associated with units manually or automatically using known entities in database 103.

Integrator 138 may collect all available information from each sensor, based on the unique identifier. If multiple pieces of information are received corresponding to the same unique identifier, such as for example where multiple sensors can detect the same unit, integrator 138 may use the information with the most recent time stamp. If information is too old, integrator may simply discard the information or add a tag to the information indicating that the information is less reliable—e.g. over 30 seconds old. Integrator 138 can average a plurality of received sensor information to reduce noise contribution. Integrator 138 can combine distinct characteristics from multiple sensors into one composite report. Older data can be extrapolated by integrator 138 to estimate current positions.

System 100 can provide tracking and fusion capabilities by correlating position and other attributes. For example, with cooperative sensors, position location information (PLI) sent by the sensors may contain a unique identifier such as a URN (unit reference number) or transponder identifier. Information updates regarding existing units may be made by matching these unique identifiers. With non-cooperative sensors, PLI data may not include a URN or transponder ID of a friendly unit. These non-cooperative sensors may also provide data concerning enemy or non-combat positions in addition to providing data on friendly positions. The system can fuse these reports with other known entities as discussed above. For example, in addition to being characterized as friendly, positions may also be hostile, suspect, or non-combatant.

Integrated information 132 may then be sent to converters 130 in communication with integrator 138 to produce formatted integrated information 142 that may be sent to a requesting entity (discussed below) of the same classification level 106a. Integrated information 132 may also be sent to an entity of a different classification level 106b. Combat identification server 104 may filter integrated information 132 using a filter 134 in communication with integrator 138, to remove classified information (that may be tagged) not suitable for distribution outside of the classification level 106a. Filter 134 may also be used to follow any defined rule sets regarding sharing information across classification levels. A formatter 144 in communication with filter 134 may then format the filtered integrated information to form filtered and formatted integrated information 140. Filtered and formatted integrated information 140 is in a particular format such as a SOAP (Simple Object Access Protocol) message 132 in XML (extensible markup language) format, that can be processed by a cross domain processor 102. Cross domain processor 102 is in communication with combat identification processors 104.

Cross domain processor 102 may be, for example an XTS 400 trusted computer system using a STOP OS operating system with an evaluation assurance level of EAL5+ and may process XML SOAP 1.1 messages. Cross domain processor 102 checks a format of filtered and formatted integrated information 140. If the format of filtered and formatted integrated information 140 has the requisite structure and syntax, cross domain processor 102 forwards filtered and formatted integrated information 140 to the other combat identification server 104 in the other classification level 106 (FIG. 1).

Referring to FIG. 1, using system 100, a requesting entity can obtain near real time information about units in a particular region of interest in a battlefield. Requesting entities could include, for example, any of the sensors mentioned above and/or dismounted soldiers, Joint Terminal Attack Controller (JTACs) or Tactical Air Control Party (TACPs), Forward Air Controllers (FACS), forward observers, fire support coordination centers, UAS ground control stations, TACAIR via Reverse Mode 5/IFF, etc. A requesting entity could also use a web application such as a computer 108 with a HTML (hypertext markup language) interface with access to closed network system 100. A commander or fire controller can thus find out information about a region of interest using computer 108 with such an interface. As processors 104 can be in communication with other processors 120, system 100 enables numerous distributed access points. In this way, line of sight connectivity to a particular processor 104 is not necessary.

Figure 3:
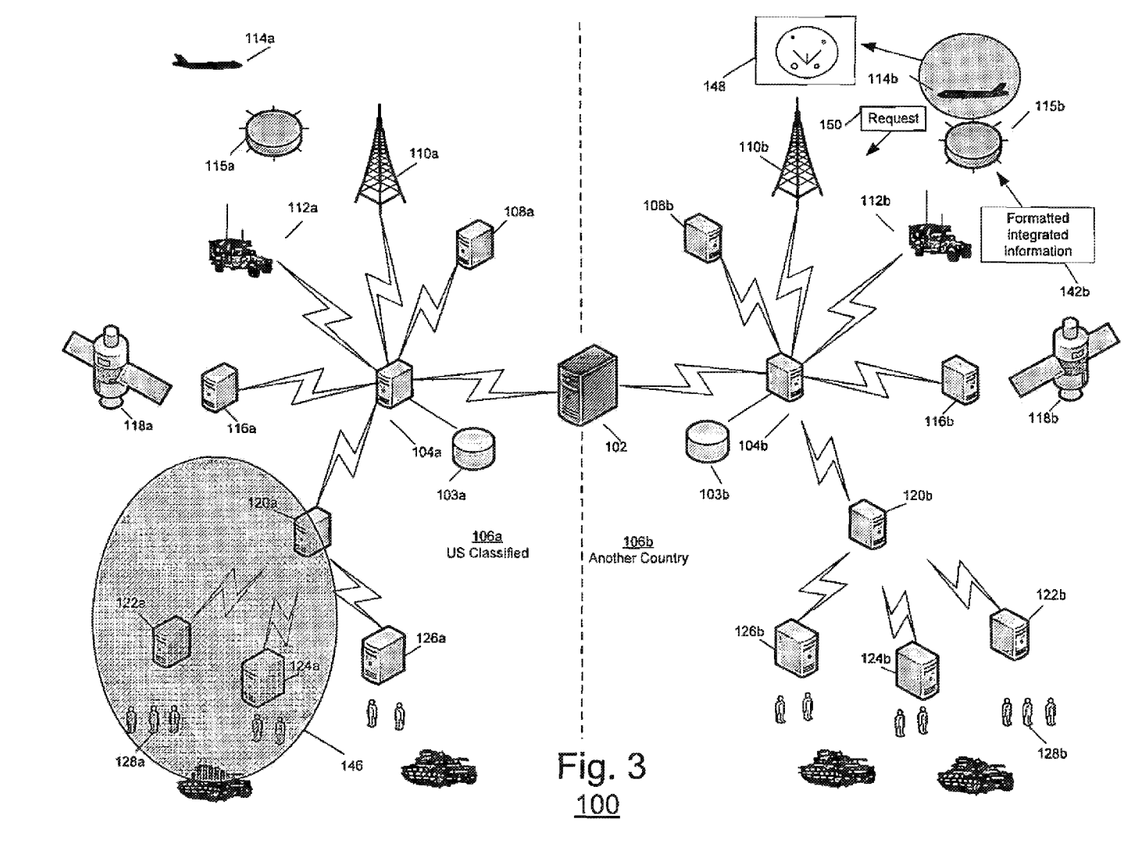
FIG. 3 is a system drawing of a system for generating target area information of a battlefield in accordance with an embodiment of the invention.
Figure 4:
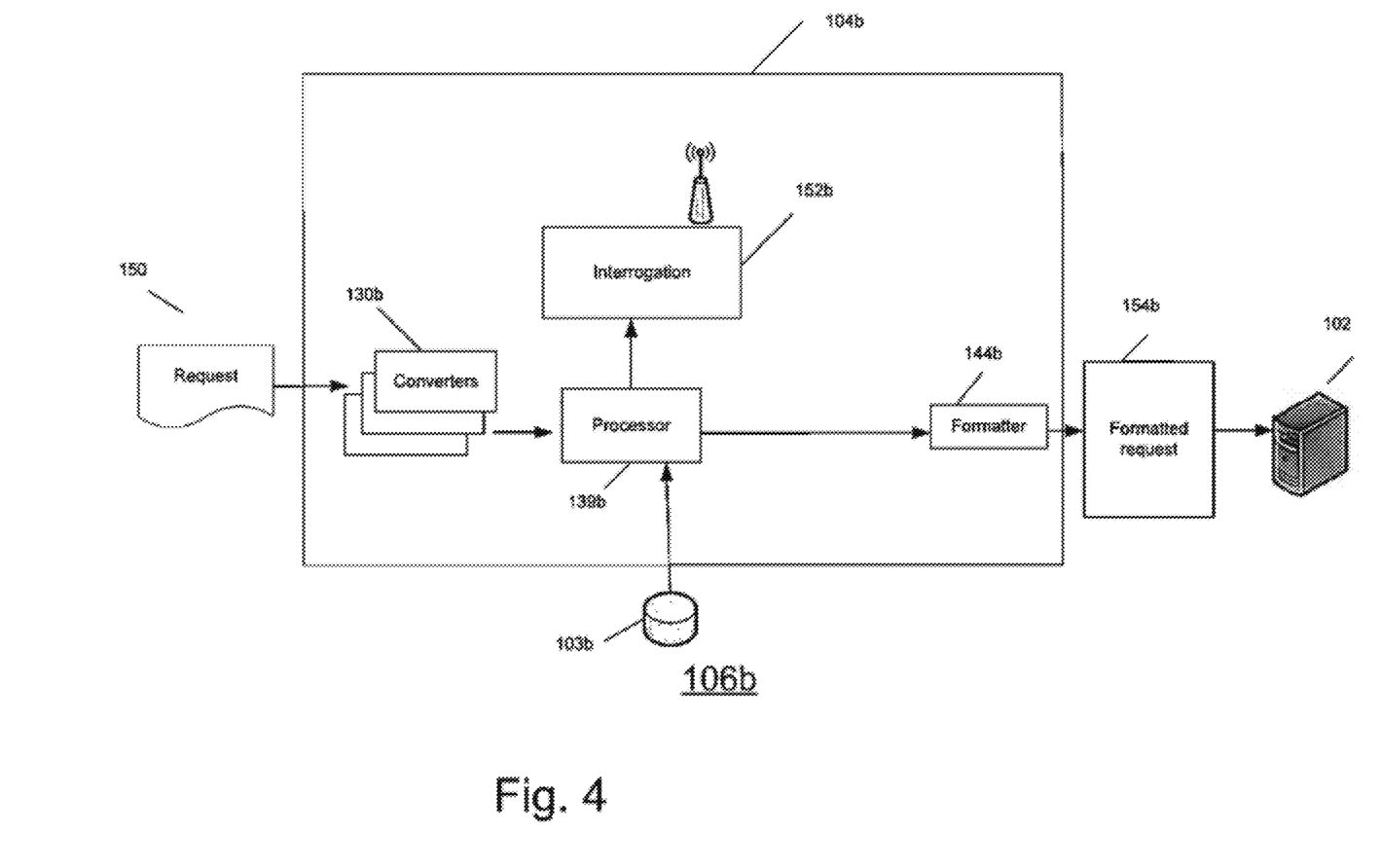
FIG. 4 is a system drawing of a combat identification processor and cross domain processor in accordance with an embodiment of the invention.

For example, referring to FIG. 3, assume an aircraft 114b is interested in acquiring information about a region of interest 146. Aircraft 114b may send a request 150 for information regarding region of interest 146 to combat identification processor 104b using, for example, a J12.6 message sent over a LINK 16 or SADL network 115b to an ASOC Gateway 112b. Gateway 112 forwards request 150 to combat identification processor 104b. Referring to FIG. 4, combat identification processor 104b receives request 150. Request 150 may be received in a plurality of different formats and so request 150 is sent to converter 130b. After request 150 is converted by converter 130 into a standard format, a processor 139b determines which, if any, sensors in classification level 106b may have information regarding region of interest 146.

For example, combat identification processor 104b may simply interrogate all sensors in classification level 106b in response to request 150. Alternatively, the sensors in classification level 106b may have informed combat identification processor 104b or database 103b of their respective status and geography so that processor 139b knows which sensors are applicable to region of interest 146.

Figure 5:
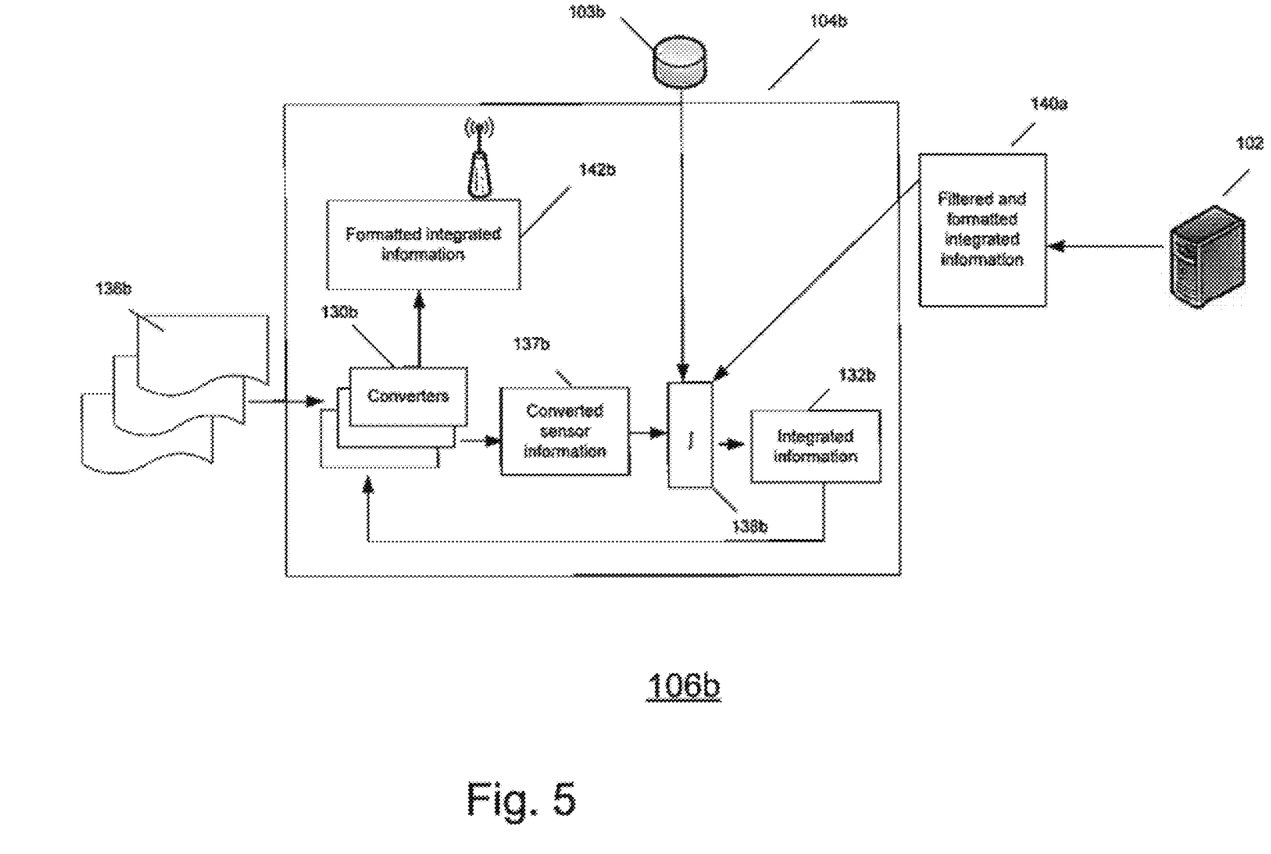
FIG. 5 is a system drawing of a combat identification processor and cross domain processor in accordance with an embodiment of the invention.

Combat identification processor 104b generates an interrogation 152b to applicable sensors. Interrogation 152b could be, for example, a RBCI interrogator, a BTID interrogator, an IFF (interrogation friend or foe) request, a RF-ID request, or any method for interrogating. Referring to FIG. 5, combat identification processor 104b thereafter receives sensor information 136b from sensors at a classification level 106b. Sensor information 136b is converted by a respective converter 130b to produce converted sensor information 137b and then integrated by integrator 138b as discussed above along with information from database 103b to produce integrated information 132b. Integrated information 132b is then converted by converter 130b into formatted integrated information 142b in a format readable by aircraft 114b. Referring also to FIG. 3, formatted integrated information 142b is then sent to aircraft 114*b* through ASOC gateway 112*b* and LINK16 network 115*b*. Aircraft 114*b* can use formatted integrated information 142*b* to produce a combat identification display 148*b* of region of interest 146. Display 148*b* now includes information from classification level 106*b*.

Figure 6:
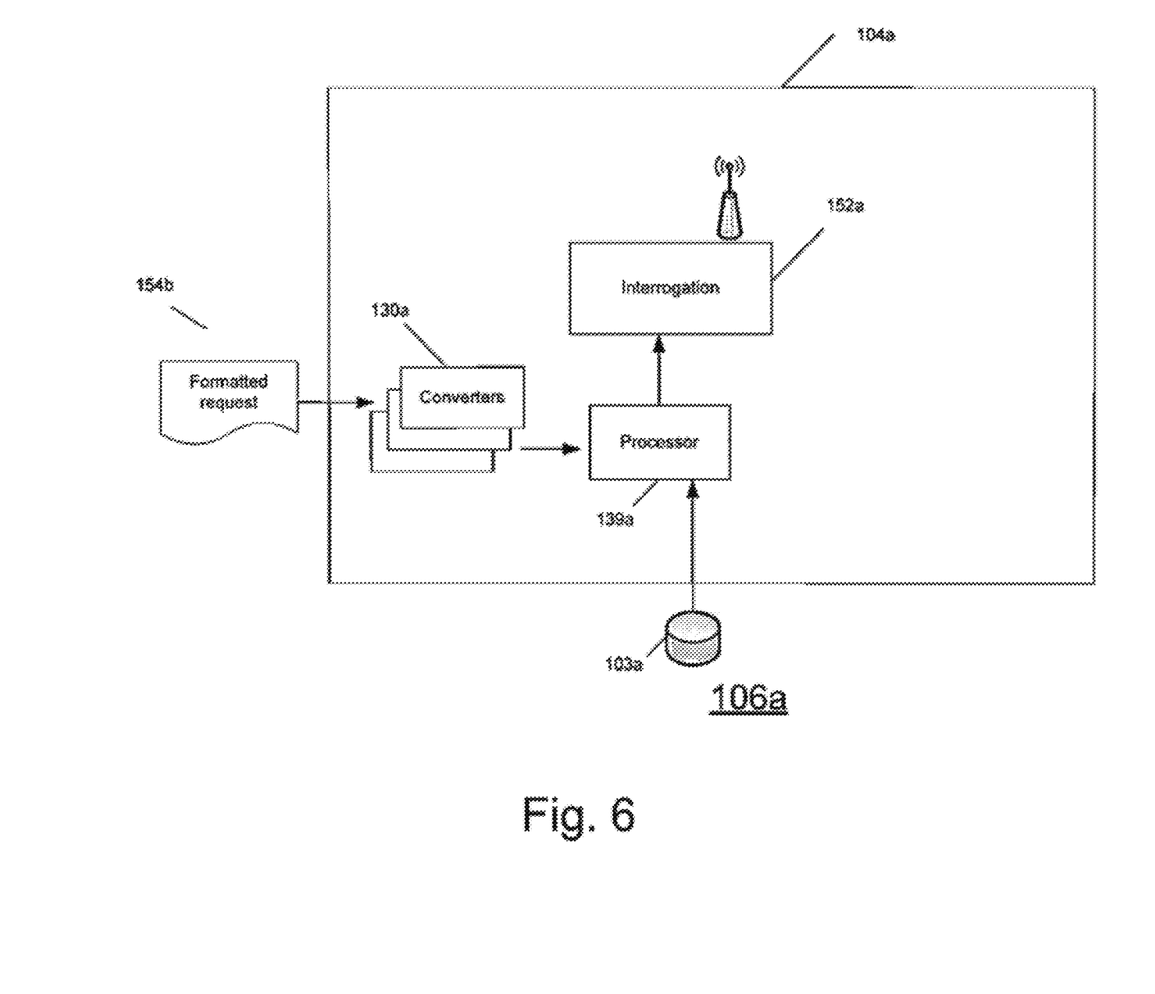
FIG. 6 is a system drawing of a combat identification processor in accordance with an embodiment of the invention

Combat identification processor 104*b* may also acquire information about region of interest 146 from classification level 106*a*. As shown in FIG. 4, combat identification server 104*b*, after converting request 150 in converter 130*b*, may forward request 150 to formatter 144*b* to produce a formatted request 154*b*. Formatted request 154*b* is sent to cross domain processor 102 and then to combat identification processor 104*a*. Referring to FIG. 6, combat identification processor 104*a* processes formatted request 154*b* in the same way as combat identification processor 104*b*. That is, combat identification processor 104*a* uses processor 139*a* to determine which, if any, sensors in classification level 106*a* may have information regarding region of interest 146.

For example, combat identification processor 104*a* may simply interrogate all sensors in classification level 106*a* in response to formatted request 154*a*. Alternatively, the sensors in classification level 106*a* may have informed combat identification processor 104*a* or database 103*a* of their respective status and geography so that processor 139*a* knows which sensors are applicable to region of interest 146.

Figure 7:
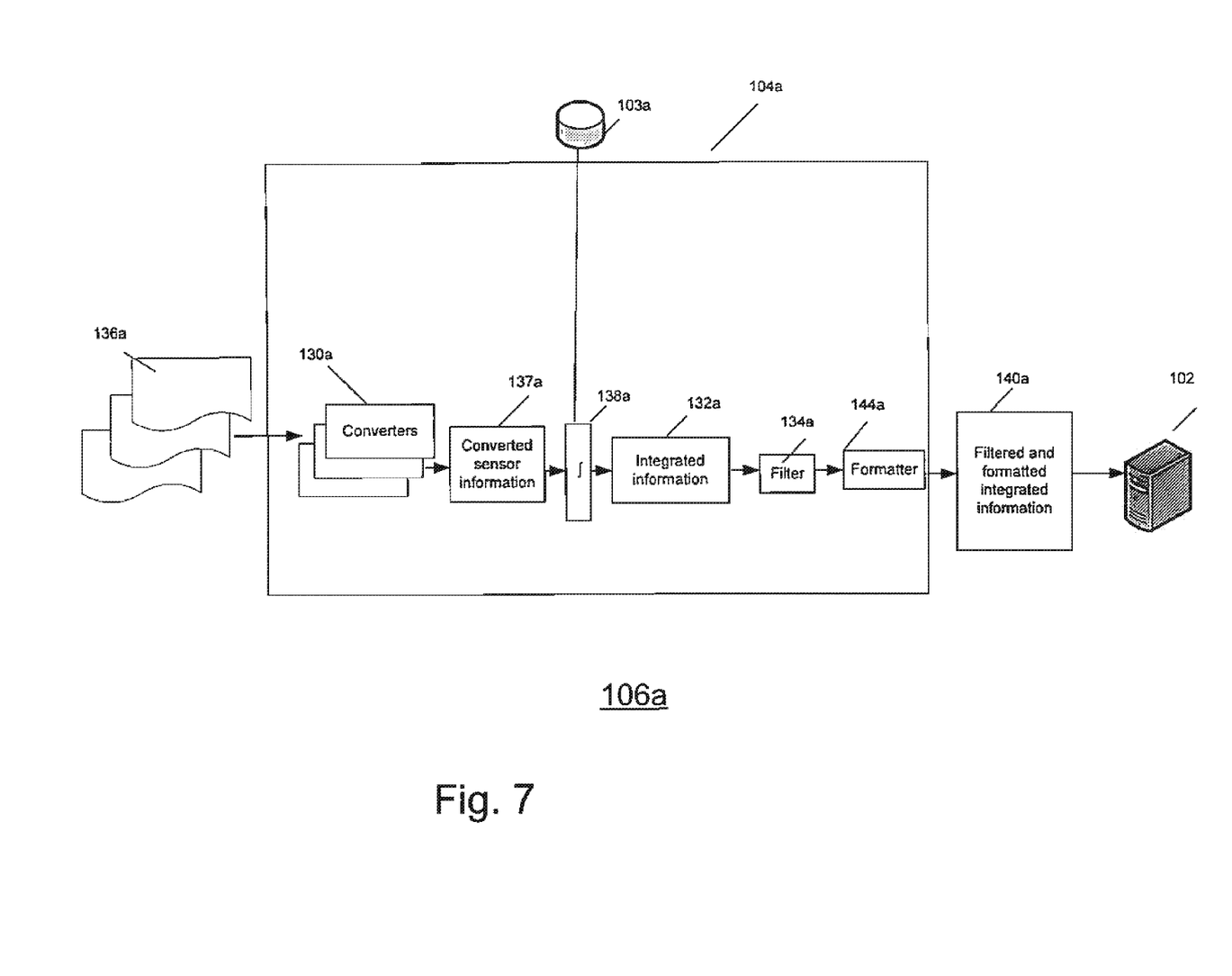
FIG. 7 is a system drawing of a combat identification processor and cross domain processor in accordance with an embodiment of the invention.

Combat identification processor 104*a* generates an interrogation 152*a* to applicable sensors. Referring to FIG. 7, combat identification processor 104*a* thereafter receives sensor information 136*a* in classification level 106*a*. Sensor information 136*a* is converted by a respective converter 130*a* and then integrated by integrator 138*a* along with information from database 103*a* to produce integrated information 132*a*. If integrated information 132*a* includes information tagged that should not go outside classification level 106*a*, filter 134*a* filters such tagged classified information based on a set of rules. Formatter 144*a* formats the resulting information to produce filtered and formatted integrated information 140*a*. Filtered and formatted integrated information 140*a* is sent to cross domain processor 102 and then to combat identification processor 104*b*.

Referring again to FIG. 5, combat identification processor 104*b* receives filtered and formatted integrated information 140*a* from cross domain processor 102 (and classification level 106*a*), sensor information 136*b* from classification level 106*b* and any information in database 103*b*. Information 140*a*, 136*b* and 103*b* are integrated by integrator 138*b* to produce integrated information 132*b*. Referring also to FIG. 3, integrated information 132 is then converted by converter 130 into formatted integrated information 142*b* and sent to aircraft 114*b* to produce display 148. Display 148 now includes information that came from the networks with the classification levels 106*a* and 106*b*. Display 148 may include all integrated information 132*b* or may be narrowed down such as displaying only the closest X number of friendly units. Display 148 can also correlate integrated information 132 with other databases such as a topology or terrain related database. For example, information regarding images in the past or other characteristics such as those that may be collected from hyperspectral sensors may be added to appropriate databases to enhance integrated information 132. Display 148 may include information displayed on a battle management system (BMS) and multi-function display (MFD) screens with icons, symbols and plain text. Requesting entity 114*b* can now make a decision whether or not to engage region of interest 146 and can better select weapon types.

After formatted integrated information 142*b* is sent to aircraft 114*b*, combat identification processors 104*a* and 104*b* may send out a warning to region of interest 146 about a potential air strike. For example, combat identification processors 104*a* and 104*b* can send a text or simple message service (SMS) message to cellular phones serviced in area of interest 146.

In addition to information provided by sensors, combat identification processors 104*a* and 104*b* can receive information regarding civilian areas like hospitals, schools, humanitarian relief efforts, refugee camps, cultural and religious sites, etc. Such civilian information may form a "no strike" list and can be stored in database 103 and included in integrated information 132.

Figure 8:
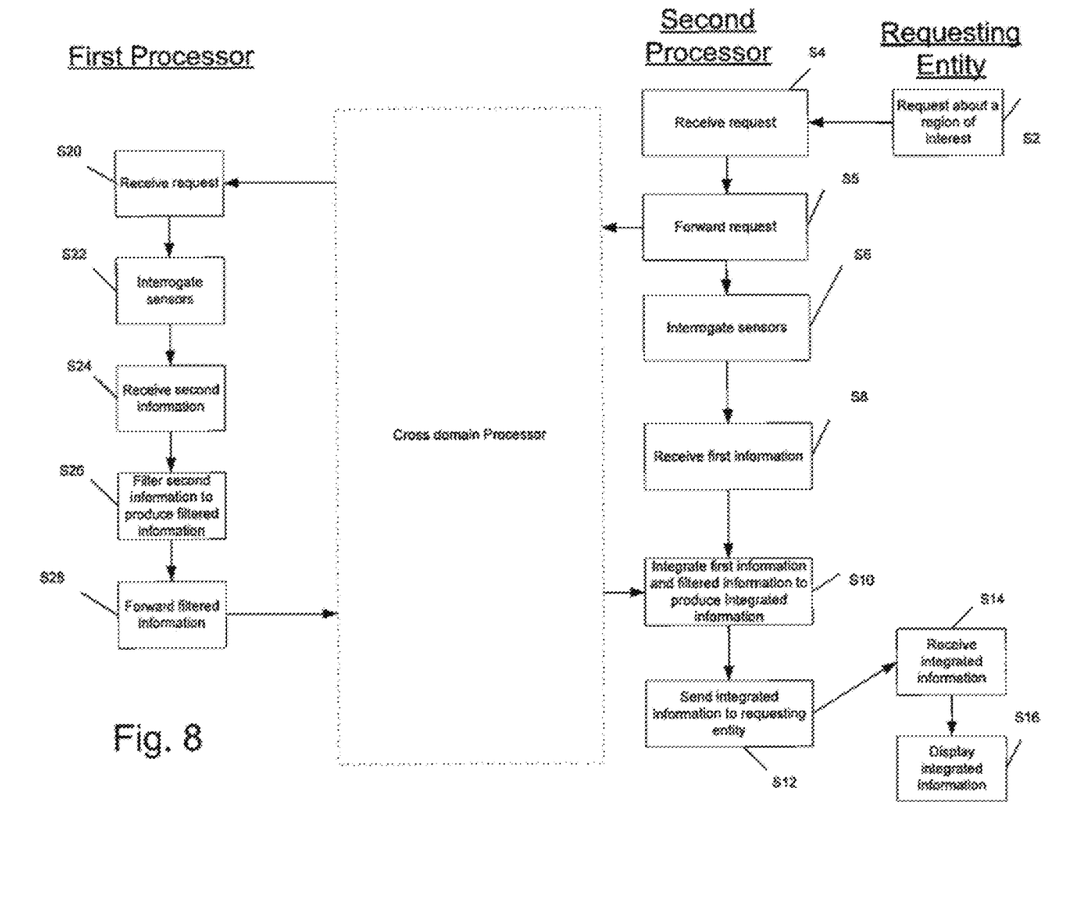
FIG. 8 is a flow drawing illustrating a process which could be performed in accordance with an embodiment of the invention.

Referring to FIG. 8, there is shown a flow chart of a process which could be performed in accordance with an embodiment of the invention. The process of FIG. 8 could be performed using, for example, system 100 described above including a first processor, a second processor and a cross domain processor. As shown, at step S2, a requesting entity makes a request for information about a region of interest. At step S4, the request is received, by a second processor. At step S5, the request is sent to a first processor through a cross-domain processor. The first and second processors may receive information at different classification levels.

At step S6, the second processor interrogates sensors in communication with the second processor. The interrogation is based on the region of interest. At step S8, first information from the sensors is received by the second processor. Meanwhile, at the first processor, the request is received at step S20. At step S22, the first processor interrogates sensors in communication with the first processor based on the region of interest. At step S24, the first processor receives second information from the sensors. At step S26, the first processor filters the second information based on the first and second classification levels to produce filtered information. For example, if the first processor has a higher classification level, the first processor may remove certain information from the second responses. Alternatively, if the first and second processors have the same classification levels or the second processor has a higher classification level, the first processor may not remove any information. At step S28, the first processor sends the filtered information to the second processor through the cross-domain processor.

At step S10, the second processor integrates the first responses and the filtered information to produce integrated information. At step S12, the integrated information it sent to the requesting entity. At step S14, the integrated information is received by the requesting entity. At step S16, the integrated information is displayed by the requesting entity.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A system for generating target area information, the system comprising:
    a first processor effective to receive first information of a first classification level;
    a second processor effective to receive second information of a second classification level distinct from the first classification level; and a cross domain processor in communication with the first and second processors; wherein the second processor is effective to
  receive a request from a requesting entity about a region of interest;
  interrogate a first sensor regarding the request;
  receive first information from the first sensor; and
  send the request through the cross domain processor to the first processor;

the first processor is effective to
  interrogate a second sensor regarding the request;
  receive second information from the second sensor;
  filter the second information based on the first and second classification levels to produce filtered information; and
  send the filtered information through the cross domain processor to the second processor;

the second processor further effective to
  integrate the first information and the filtered information to produce integrated information; and
  send the integrated information to the requesting entity.

2. The system as recited in claim 1, wherein the first classification level includes information that is sensitive to the United States and the second classification level includes information that is sensitive to another country.

3. The system as recited in claim 1, wherein the first sensor communicates using a NFFI protocol.

4. The system as recited in claim 1, wherein at least one of the interrogate the first sensor and the interrogate the second sensor includes
  sending a request to a third processor; and
  sending an interrogation from the third processor.

5. The system as recited in claim 1, wherein at least one of the first and second processors further generate a SMS message to cellular phones in the region of interest.

6. The system as recited in claim 1, further comprising
  a database in communication with at least one of the first and second processors, the database including further information about the region of interest; and
  the integrated information includes the further information.

7. The system as recited in claim 6, wherein the further information includes a no strike list.

8. The system as recited in claim 1, wherein the integrate the first information and the filtered information includes tagging the integrated information based on an age of the first information and the filtered information.

9. The system as recited in claim 1, wherein:
  the interrogate the first sensor regarding the request includes interrogating a plurality of first sensors;
  the receive the first information from the first sensor includes receiving a plurality of pieces of first information;
  the interrogate the second sensor regarding the request includes interrogating a plurality of second sensors;
  the receive the second information from the second sensor includes receiving a plurality of second pieces of information;
  the filter the second information based on the first and second classification levels to produce the filtered information includes filtering the plurality of second pieces of information to produce a plurality of filtered pieces of information; and
  the integrate the first information and the filtered information to produce integrated information includes integrating the plurality of pieces of first information and the plurality of filtered pieces of information.

10. The system as recited in claim 1, wherein the filter the second information includes filtering based on a tag associated with the second information.

11. The system as recited in claim 1, further comprising:
  a database, the database effective to receive sensor information from at least one of the first and the second sensors; and wherein
  the second processor is further effective to integrate the first response, the filtered response and the sensor information to produce the integrated information.

12. A method for generating target area information in a system comprising a first processor effective to receive first information of a first classification level, a second processor effective to receive second information of a second classification level distinct from the first classification level, and a cross domain processor in communication with the first and second processors, the method comprising:
  at the second processor
    receiving a request from a requesting entity about a region of interest;
    interrogating a first sensor regarding the request;
    receiving first information from the first sensor; and
    sending the request through the cross domain processor to the first processor;
  at the first processor
    interrogating a second sensor regarding the request;
    receiving second information from the second sensor;
    filtering the second information based on the first and second classification levels to produce filtered information; and
    sending the filtered information through the cross domain processor to the second processor;
  at the second processor
    integrating the first information and the filtered information to produce integrated information; and
    sending the integrated information to the requesting entity.

13. The method as recited in claim 12, wherein at least one of the interrogating the first sensor and the interrogating the second sensor includes
  sending a request to a third processor; and
  sending an interrogation from the third processor.

14. The method as recited in claim 12, wherein at least one of the first and second processors further performs the step of generating a SMS message to cellular phones in the region of interest.

15. The method as recited in claim 12, further comprising
  a database in communication with at least one of the first and second processors, the database including further information about the region of interest and the integrated information includes the further information.

16. The method as recited in claim 14, wherein the further information includes a no strike list.

17. The method as recited in claim 12, wherein the integrating the first information and the filtered information includes tagging the integrated information based on an age of the first information and the filtered information.

18. A processing system having a computer comprising:
  a converter contained in the computer effective to receive sensor information and convert the sensor information into converted sensor information;
  an integrator contained in the computer in communication with the converter, the integrator effective to receive and integrate the converted sensor information to produce integrated information;

the converter further in communication with the integrator and effective to receive and convert the integrated information to produce formatted integrated information;

a filter contained in the computer in communication with the integrator, the filter effective to receive and filter the integrated information based on a classification level of the sensor information to produce filtered information; and a formatter contained in the computer in communication with the filter, the formatter effective to receive and format the filtered information to produce filtered and formatted integrated information.

19. The processing system as recited in claim 18, wherein:

the converter is further effective to receive a request about a region of interest;

the processor is effective to generate an interrogation based on the request; and the sensor information is received by the converter based on the interrogation.

20. The processing system as recited in claim 18, wherein the integrator is further effective to receive and integrate information received from a database.

* * * * *